(12) United States Patent
Chen

(10) Patent No.: US 7,603,749 B2
(45) Date of Patent: Oct. 20, 2009

(54) DUAL-AXIS HINGE FOR A PORTABLE ELECTRONIC DEVICE

(75) Inventor: Chia-Hsiang Chen, Shulin (TW)

(73) Assignee: Shin Zu Shing Co., Ltd. (TW)

( * ) Notice: Subject to any disclaimer, the term of this patent is extended or adjusted under 35 U.S.C. 154(b) by 306 days.

(21) Appl. No.: 11/731,383

(22) Filed: Mar. 30, 2007

(65) Prior Publication Data

US 2008/0235908 A1     Oct. 2, 2008

(51) Int. Cl.
*E05D 7/00*     (2006.01)
(52) U.S. Cl. ................................. 16/367; 16/303
(58) Field of Classification Search .................. 16/367, 16/334, 336, 340, 330, 319, 321, 325, 368, 16/369, 338, 374; 379/433.13, 433.11, 433.12, 379/433.01; 455/347, 348, 575.1, 575.3, 455/550.1; 361/679.02, 679.06, 679.07, 361/679.12, 679.24, 679.23, 679.27, 679.28, 361/679.3
See application file for complete search history.

(56) References Cited

U.S. PATENT DOCUMENTS 6,305,050 B1 * 10/2001 Imai ........................... 16/303
6,845,546 B1 * 1/2005 Lu et al. ...................... 16/367
7,017,235 B2 * 3/2006 Lu et al. ...................... 16/367
7,319,749 B2 * 1/2008 Lu et al. ................. 379/433.13

\* cited by examiner

*Primary Examiner*—Robert J Sandy
*Assistant Examiner*—Rowland D Do
(74) *Attorney, Agent, or Firm*—Jackson Walker, LLP

(57) ABSTRACT

A dual-axis hinge for a portable electronic device has at least one stationary bracket, a pivoting bracket and a connecting leaf. The stationary bracket is adapted to be mounted securely in a base of the portable electronic device. The pivoting bracket is mounted pivotally in the stationary bracket and pivot relative to the stationary bracket in a first axis. The connecting leaf is adapted to be connected with a cover of the portable electronic device, is pivotally mounted in the pivoting bracket and pivots relative to the pivoting bracket in a second axis that is in different direction from the first axis. With such an arrangement, the cover connected with the connecting leaf may pivot relative to the base in the first axis and the second axis respectively and allows the portable electronic device to make more motivation and contents to various applicability requirements.

6 Claims, 12 Drawing Sheets

US 7,603,749 B2

DUAL-AXIS HINGE FOR A PORTABLE ELECTRONIC DEVICE

BACKGROUND OF THE INVENTION

1. Field of the Invention

The present invention relates to a hinge, and more particularly to a dual-axis hinge for a portable electronic device that allows a cover of a portable electronic device to pivot relative to a base in two axes in different directions.

2. Description of Related Art

Portable electronic devices such as notebook computers, cellular phones and the like are commonly used in daily life. Generally, a portable electronic device comprises a base, a cover and a hinge. The cover usually has a display. The hinge pivotally connects the cover to the base, and allows the cover to pivot away from the base when the electronic device is in use.

However, as more and more functions or programs in the portable electronic device have been developed, said conventional hinges that pivot the cover in a single axis gradually become inadequate to use.

To overcome the shortcomings, the present invention provides a dual-axis hinge for a portable electronic device to obviate or mitigate the aforementioned problems.

SUMMARY OF THE INVENTION

The main objective of the present invention is to provide a dual-axis hinge for a portable electronic device and that allows a cover of the portable electronic device to pivot relative to a base in two axes in different directions. Such that the dual-axis hinge provides more applicability when use in the portable electronic device.

To achieve the objective, the dual-axis hinge in accordance with present invention comprises at least one stationary bracket, a pivoting bracket and a connecting leaf.

The stationary bracket can be mounted securely in a base of the portable electronic device.

The pivoting bracket is mounted pivotally in the stationary bracket and is pivoted relative to the stationary bracket in a first axis.

The connecting leaf can connect securely to a cover of the portable electronic device, is mounted pivotally on the pivoting bracket and is pivoted relative to the pivoting bracket in a second axis that is in a different direction from the first axis.

Furthermore, multiple positioning or angle-limiting components are arranged between the pivoting bracket and the stationary brackets, or the pivoting bracket and the connecting leaf.

With such an arrangement, the cover connected with the connecting leaf may pivot relative to the base in the first axis and the second axis and is then held at a desired position. Therefore, the dual-axis hinge allows the portable electronic device to make more motivation and contents to various applicability requirements.

Other objectives, advantages and novel features of the invention will become more apparent from the following detailed description when taken in conjunction with the accompanying drawings.

DETAILED DESCRIPTION OF THE PREFERRED EMBODIMENT

Figure 2:
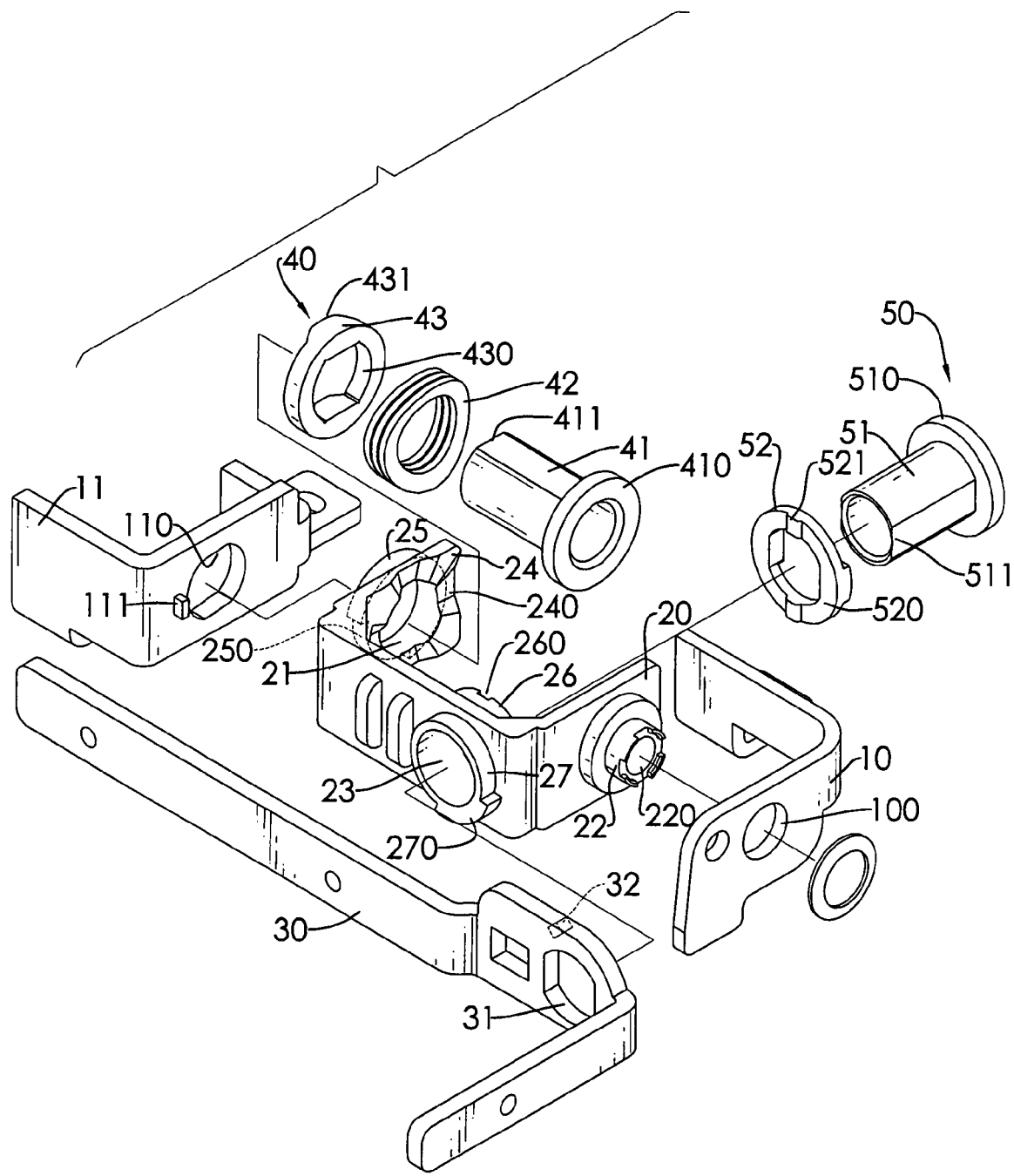
FIG. 2 is an exploded perspective view of the dual-axis hinge in FIG. 1.
Figure 8:
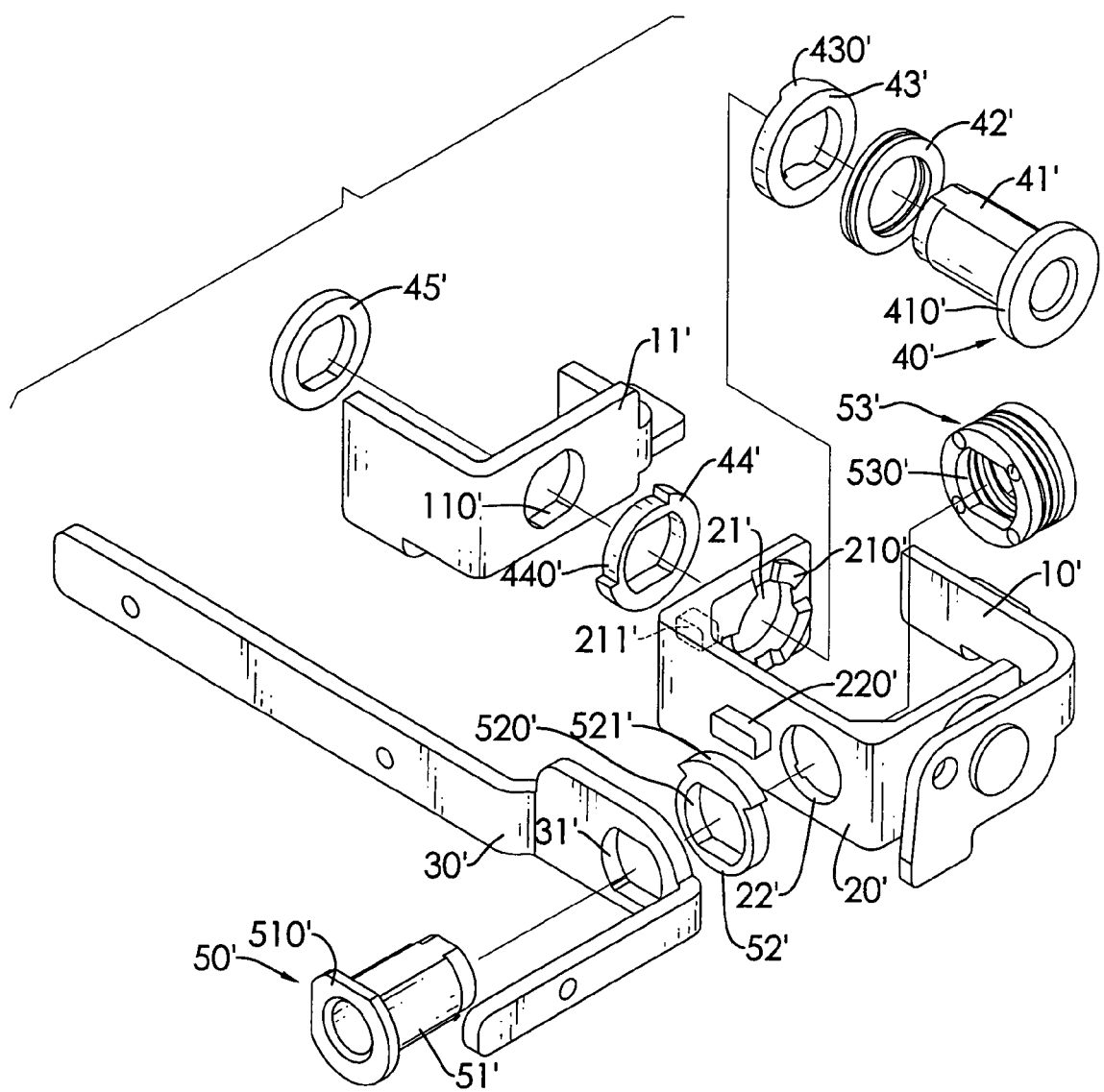
FIG. 8 is an exploded perspective view of the dual-axis hinge in FIG. 7.
Figure 9:
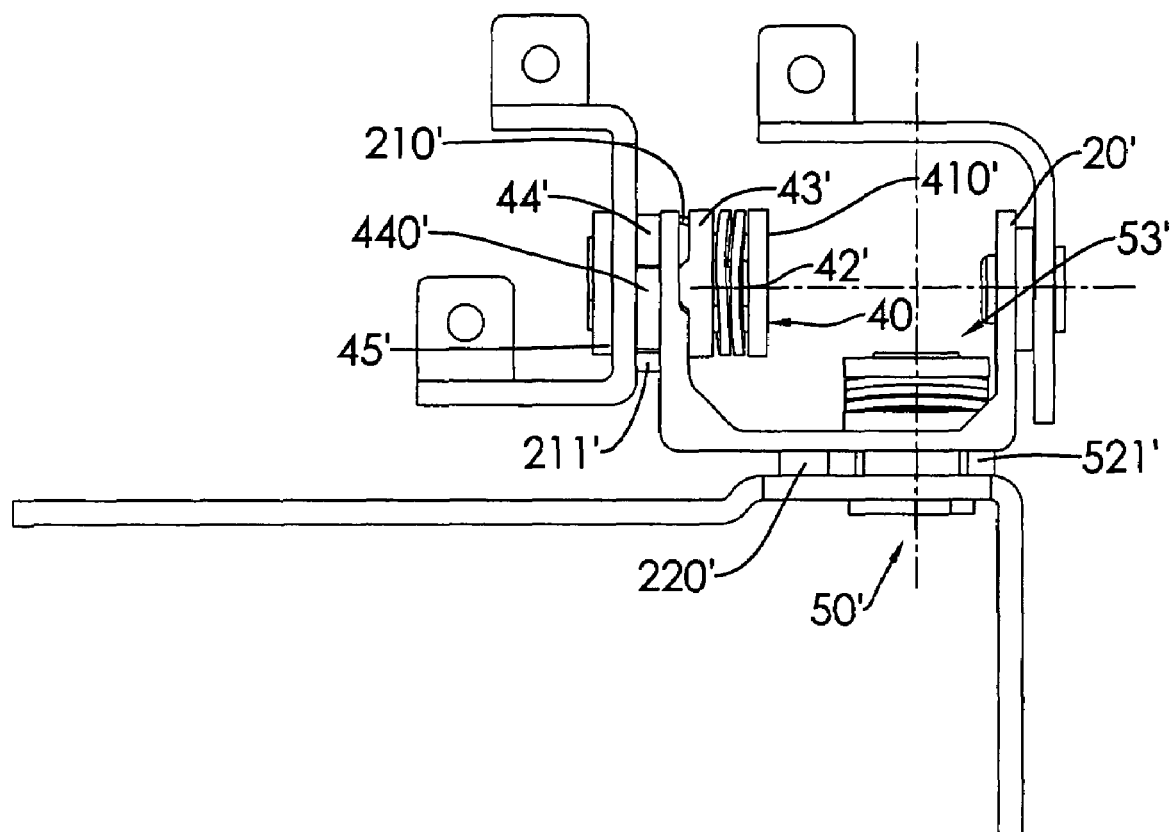
FIG. 9 is a top view of the dual-axis hinge in FIG. 7.

With reference to FIGS. 2 and 8, the dual-axis hinge for a portable electronic device comprises a first stationary bracket (11)(11'), a second stationary bracket (10)(10'), a pivoting bracket (20)(20'), a connecting leaf (30)(30'), a first mounting assembly (40)(40') and a second mounting assembly (50)(50').

Figure 1:
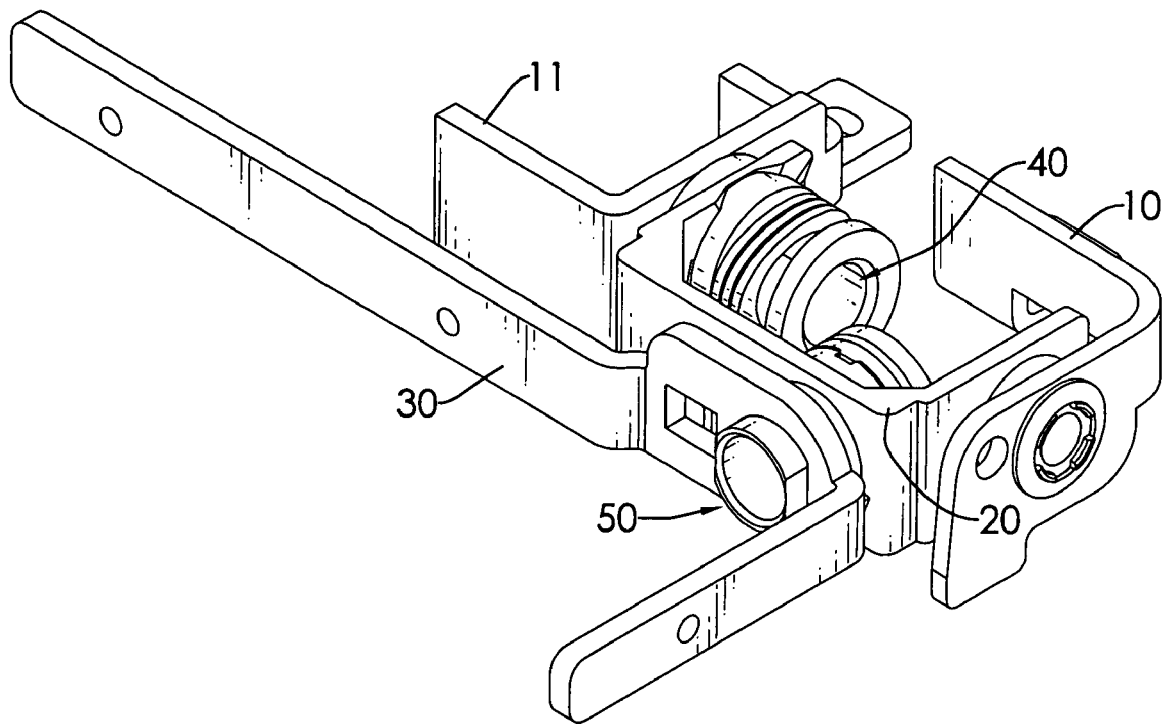
FIG. 1 is a perspective view of a first embodiment of a dual-axis hinge for a portable electronic device in accordance with the present invention.
Figure 3:
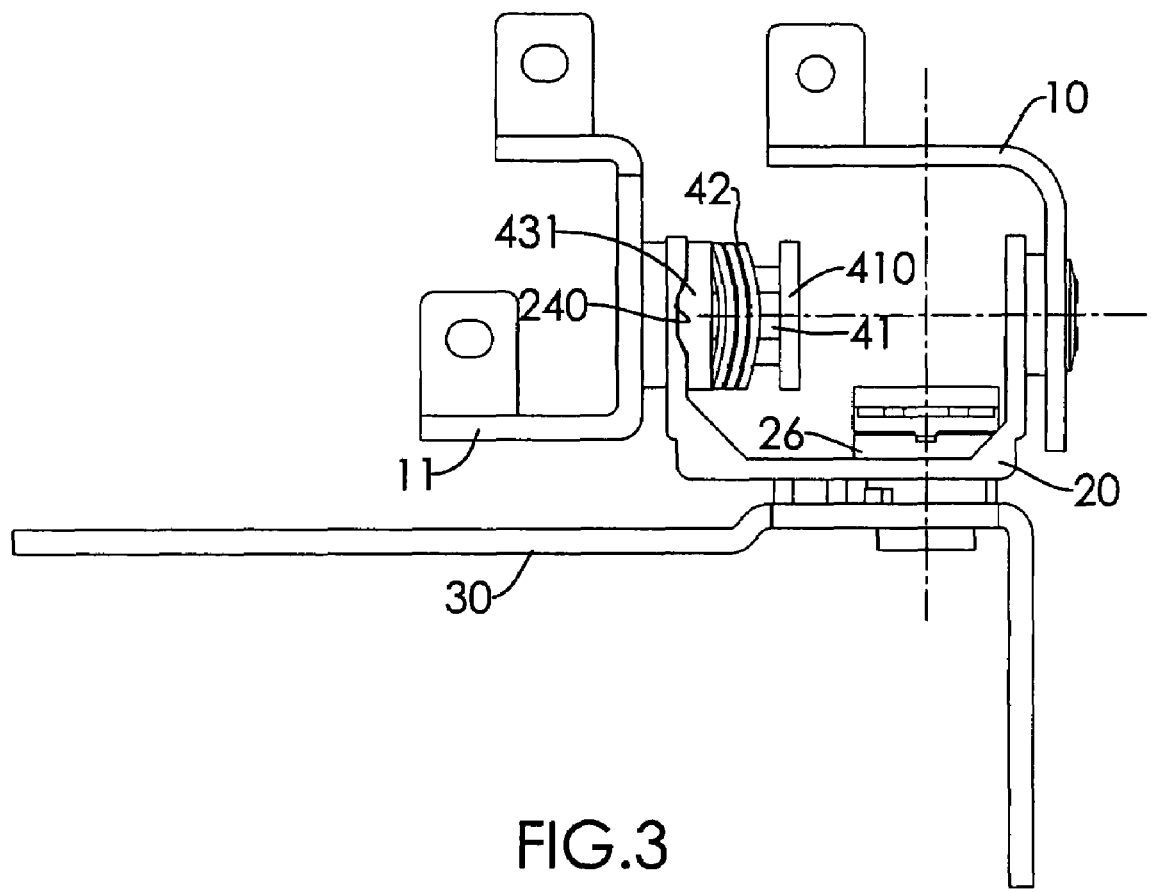
FIG. 3 is a top view of the dual-axis hinge in FIG. 1.

With reference to FIGS. 1, 2, and 3, in the first embodiment, the first stationary bracket (11) is "L" shaped and has at least one fixing hole, a surface, a non-circular first mounting hole (110) formed through the first stationary bracket (11) and a first stop (111) protruding from the surface adjacent to the first mounting hole (110). The second stationary bracket (10) is "L" shaped and separated from the first stationary bracket (11) and has at least one fixing hole, a surface and a second mounting hole (100) formed through the second stationary bracket (10) and coaxial with the first mounting hole (110).

The pivoting bracket (20) is pivotally mounted between the first stationary bracket (11) and the second stationary bracket (10), is "U" shaped and has a first end segment, a second end segment and a middle segment.

The first end segment is adjacent to the first stationary bracket (11) and has an inside surface, an outside surface, a first pivoting hole (21), an engaging portion (24) and a first limit (25). The first pivoting hole (21) is formed through the pivoting bracket (20), corresponds to the first mounting hole (110) of the first stationary bracket (11) and has an inner edge. The engaging portion (24) is formed integrally on the inside surface of the first end segment along the inner edge of the first pivoting hole (21) and has multiple radial concaves (240) and convexes arranged alternatively. The first limit (25) is formed integrally on the outside surface of the first end segment and has a central keyed hole and a recessed edge (250). The central keyed hole is non-circular and corresponds to the first pivoting hole (21). The recessed edge (250) has a length and two ends corresponding to and selectively abutting the first stop (111) of the first stationary bracket (11) to limit the pivot angle of the pivoting bracket (20) relative to the stationary brackets (10)(11).

The second end segment is adjacent to the second stationary bracket (10) and has an outside surface and a fastener (22). The fastener (22) protrudes from the outside surface of the second end segment, corresponds to and rotatably engages with the second mounting hole (100) of the second stationary bracket (10) and has multiple resilient protrusions (220). The resilient protrusions (220) are formed peripherally around the fastener (22) and respectively have an end and a tooth formed in the end to engage with the second mounting hole (100) with a ring and allows the pivoting bracket (20) pivot relative to the second stationary bracket (10).

The middle segment connects between the first end segment and the second segment and has an inside surface, an outside surface, a second limit (27), a retaining element (26) and a third pivoting hole (23). The second limit (27) is formed integrally on the outside surface of the middle segment and has a protruding flange (270) protrudes radially out from the second limit (27) and extends a radian. The retaining element (26) has a surface and a notch (260) formed diametrically in the surface. The third pivoting hole (23) is formed longitudinally through the second limit (27), the middle segment and the retaining element (26).

The connecting leaf (30) is "L" shaped and has multiple fixing hole and a mounting portion formed on a corner of the connecting leaf (30). The mounting portion has a surface, a connecting hole (31) and a second stop (32). The connecting hole (31) is formed through the mounting portion, corresponds to the third pivoting hole (23) of the middle segment and is non-circular. The second stop (32) protrudes from the surface of the mounting portion and corresponds to and selectively abuts the protruding flange (270) of the second limit (27) to limit the pivoting range of the connecting leaf (30).

The first mounting assembly (40) comprises a first pintle (41), a positioning element (43) and multiple spacers (42). The first pintle (41) is non-circular in cross section and has a flange (410) and an end (411). The end (411) extends through the first pivoting hole (21) of the first end segment of the pivoting bracket (20) and engages with the first mounting hole (110) of the first stationary bracket (11), so as to allow the pivoting bracket (20) to pivot relative to the first stationary bracket (11) in a first axis. The positioning element (43) is mounted on the first pintle (41), corresponds to the engaging portion (24) of the first end segment and has a central hole (430) and two salients (431). The central hole (430) is non-circular and is engaged with the first pintle (41) to make the positioning element (43) rotate simultaneously with the first pintle (41). The salients (431) selectively engage with the concaves (240) of the engaging portion (24) to retain the position of the pivoting bracket (20) relative to the first stationary bracket (11). The spacers (42) are mounted between the flange (410) of the first pintle (41) and the positioning element (43) and prevent abrasion of the positioning element (43).

The second mounting assembly (50) comprises a second pintle (51) and a retaining member (52). The second pintle (51) is non-circular in cross section and has a flange (510) and an end (511). The end (511) extends through the third pivoting hole (23) of the middle segment of the pivoting bracket (20) and engages with the connecting hole (31) of the connecting leaf (30), so as to allow the connecting leaf (30) to pivot relative to the pivoting bracket (20) in a second axis. The retaining member (52) is mounted on the second pintle (51), corresponds to the retaining member (52) of the middle segment of the pivoting bracket (20) and has a surface, an engaging hole (520) and two ribs (521). The engaging hole (520) is non-circular and is engaged with the second pintle (51) to make the positioning element (43) rotate simultaneously with the second pintle (51). The ribs (521) are diametrically formed on the surface of the retaining member (52) and selectively engage with the notch (260) of the retaining element (26) to retain the position of the connecting leaf (30) relative to the pivoting bracket (20).

Figure 7:
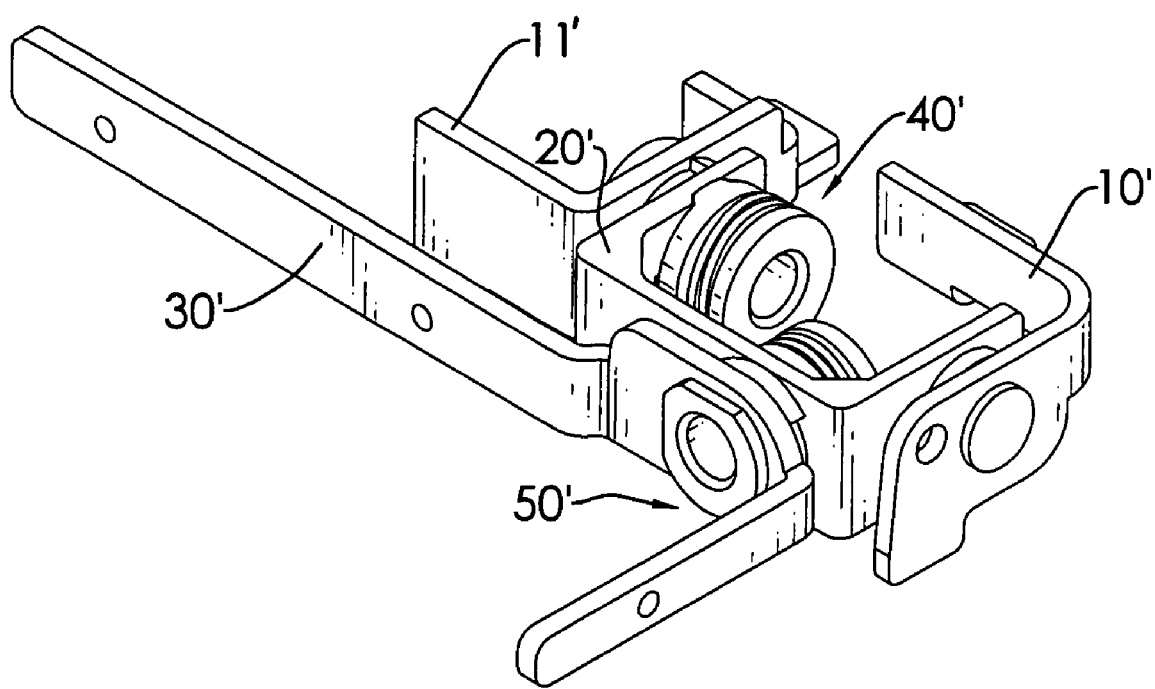
FIG. 7 is a perspective view of a second embodiment of a dual-axis hinge for a portable electronic device in accordance with the present invention.

With reference to FIGS. 7 and 8, in the second embodiment, the first stationary bracket (11') is "L" shaped and has a surface, at least one fixing hole and a non-circular first mounting hole (110') formed through the surface. The second stationary bracket (10') is "L" shaped and separated from the first stationary bracket (11') and has at least one fixing hole and a second mounting hole formed through the surface and is coaxial with the first mounting hole (110').

The pivoting bracket (20') is pivotally mounted between the first stationary bracket (11') and the second stationary bracket (10'), is "U" shaped and has a first end segment, a second end segment and a middle segment.

The first end segment is adjacent to the first stationary bracket (11') and has an inside surface, an outside surface, a first pivoting hole (21'), an engaging portion (210') and a first stop (211'). The first pivoting hole (21') is formed through the pivoting bracket (20'), corresponds to the first mounting hole (110') of the first stationary bracket (11') and has an inner edge. The engaging portion (210') is formed integrally on the inside surface of the first end segment along the inner edge of the first pivoting hole (21') and has multiple radial concaves and convexes arranged alternatively. The first stop (211') protrudes from the outside surface of the first end segment adjacent to the first pivoting hole (21').

The second end segment is adjacent to the second stationary bracket (10') and has an outside surface and a mounting pin. The mounting pin is formed integrally on the outside surface of the second end segment and extends through the second mounting hole of the second stationary bracket (10') to pivotally mount the second stationary bracket (10') with the second end segment.

The middle segment connects between the first end segment and the second segment and has an inside surface, an outside surface, a third pivoting hole (22') and a second stop (220'). The third pivoting hole (22') is formed longitudinally through the middle segment of the pivoting bracket. The second stop (220') protrudes from the outside surface of the middle segment.

The connecting leaf (30) is "L" shaped and has multiple fixing hole and a mounting portion formed on a corner of the connecting leaf (30). The mounting portion has a surface and a connecting hole (31'). The connecting hole (31') is formed through the mounting portion, corresponds to the third pivoting hole (22') of the middle segment and is non-circular.

The first mounting assembly (40') comprises a first pintle (41'), a positioning element (43'), multiple spacers (42'), a first limit (44') and a fixing element (45'). The first pintle (41') is non-circular in cross section and has a flange (410') and an end. The end extends through the first pivoting hole (21') of the first end segment of the pivoting bracket (20') and the first mounting hole (110') of the first stationary bracket (11'), so as to allow the pivoting bracket (20') to pivot relative to the first stationary bracket (11') in a first axis. The positioning element (43') is mounted on the first pintle (41'), corresponds to the engaging portion (210') of the first end segment and has a central hole and two salients (430'). The central hole is non-circular and is engaged with the first pintle (41') to make the positioning element (43') to rotate simultaneously with the first pintle (41'). The salients (430') selectively engage with the concaves of the engaging portion (210') to retain the position of the pivoting bracket (20') relative to the first stationary bracket (11'). The spacers (42') are mounted between the flange (410') of the first pintle (41') and the positioning element (43') and prevent abrasion of the positioning element (43'). The first limit (44') is mounted on the first pintle (41') and has a central keyed hole and a recessed edge (440'). The central keyed hole is non-circular, corresponds to the first pivoting hole (21') and allows the first pintle (41') to extend through the first limit (44'). The recessed edge (440') has a length and two ends corresponding to and selectively abutting the first stop (211') of the first end segment of the pivoting bracket (20') to limit the pivot angle of the pivoting bracket (20') relative to the stationary brackets (10') (11'). The fixing element (45') is mounted securely on the end of the first pintle (41') and holds the first mounting assembly (40') in position.

The second mounting assembly (50') comprises a second pintle (51'), a second limit (52') and a retaining assembly (53'). The second pintle (51') is non-circular in cross section and has a flange (510') and an end. The end extends through the third pivoting hole (22') of the middle segment of the pivoting bracket (20') and engages with the connecting hole (31') of the connecting leaf (30'), so as to allow the connecting leaf (30') to pivot relative to the pivoting bracket (20') in a second axis.

The second limit (52') is mounted on the first pintle (41') with a non-circular through hole (520') and has a protruding flange (521') protruding radially out from the second limit (52'), extending a radian and selectively abutting the second stop (220') to limit the travel of the connecting leaf (30').

The retaining assembly (53') has a non-circular engaging hole (530') engages with the end of the second pintle (51') and rubs against the inside surface of the middle segment of the pivoting bracket (20') to retain the position of the connecting leaf (30') relative to the pivoting bracket (20').

Figure 4:
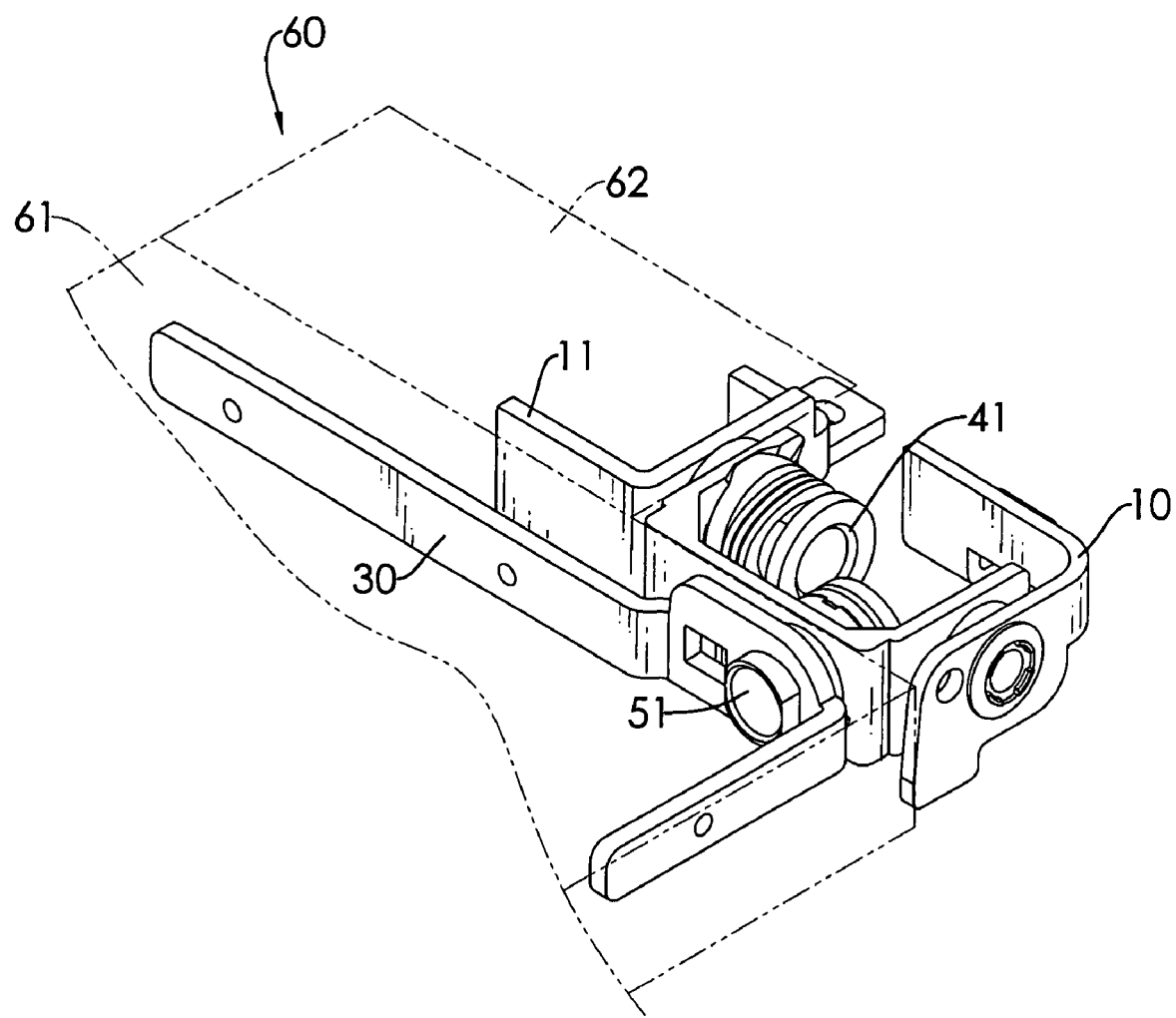
FIG. 4 is an operational perspective view of the dual-axis hinge in FIG. 1 mounted in a portable electronic device.
Figure 5:
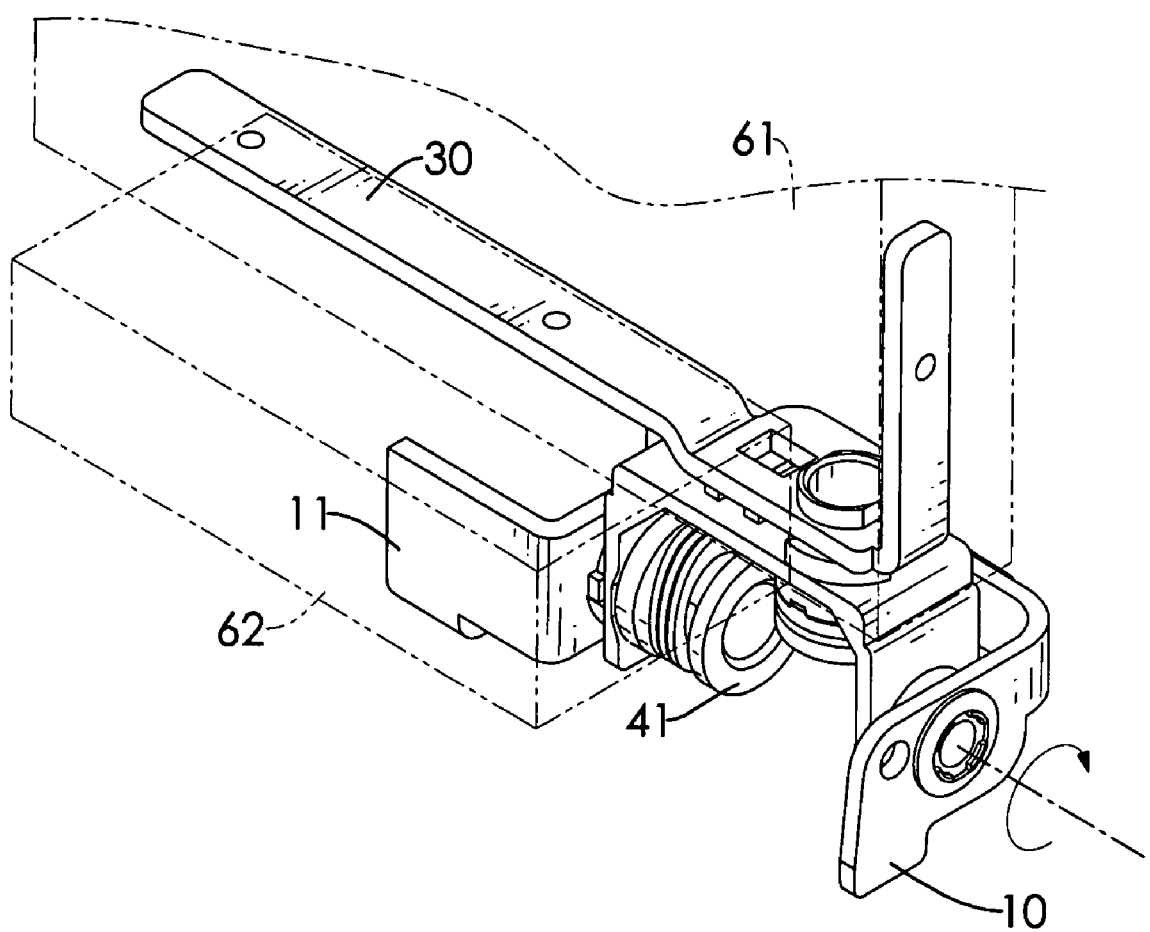
FIG. 5 is a first operational perspective view of the dual-axis hinge in FIG. 1 showing the cover pivoting relative to the base in the first axis.
Figure 6:
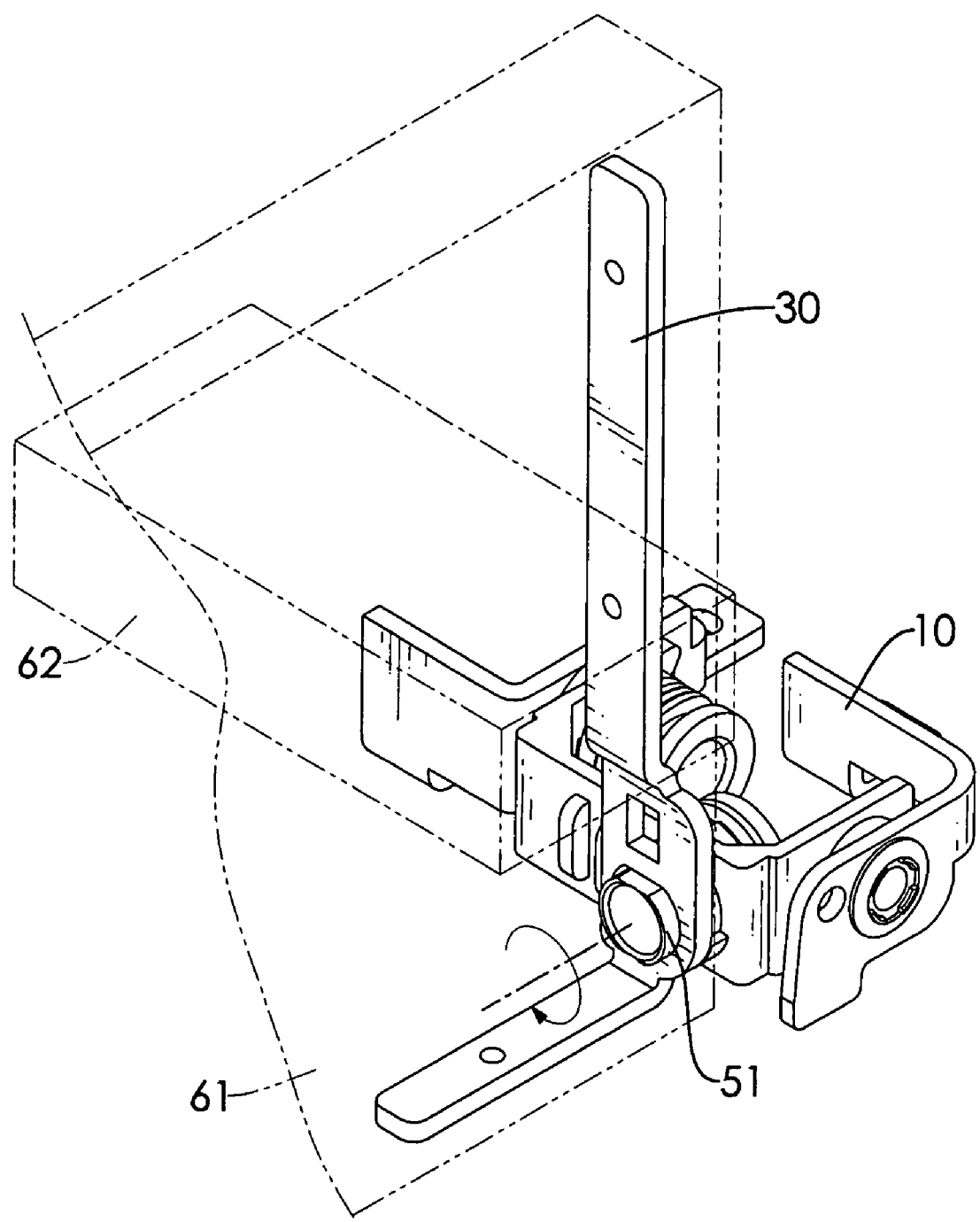
FIG. 6 is a second operational perspective view of the dual-axis hinge in FIG. 1 showing the cover pivoting relative to the base in the second axis.
Figure 10:
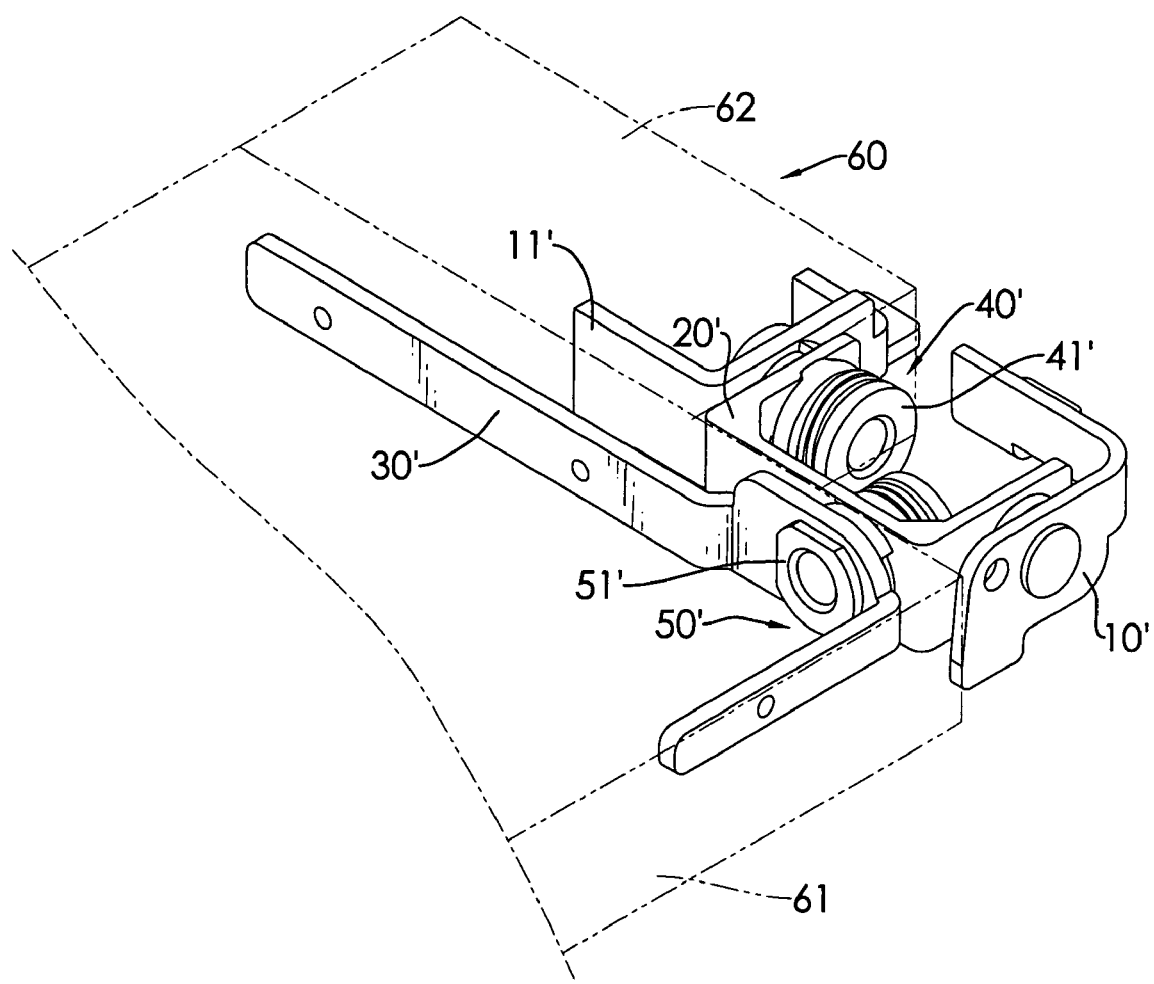
FIG. 10 is an operational perspective view of the dual-axis hinge in FIG. 7 mounted in a portable electronic device.
Figure 11:
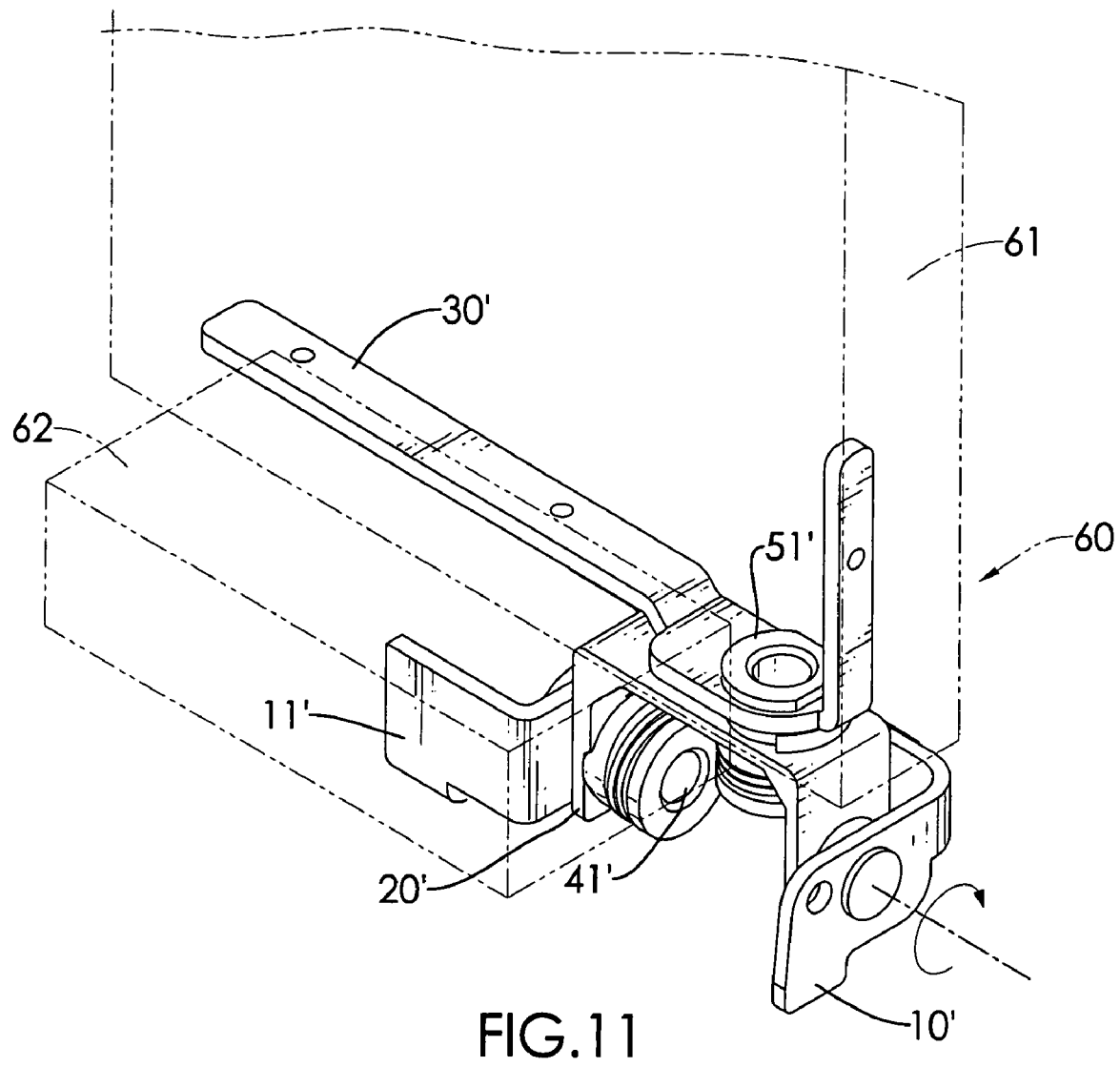
FIG. 11 is a first operational perspective view of the dual-axis hinge in FIG. 7 showing the cover pivoting relative to the base in the first axis.
Figure 12:
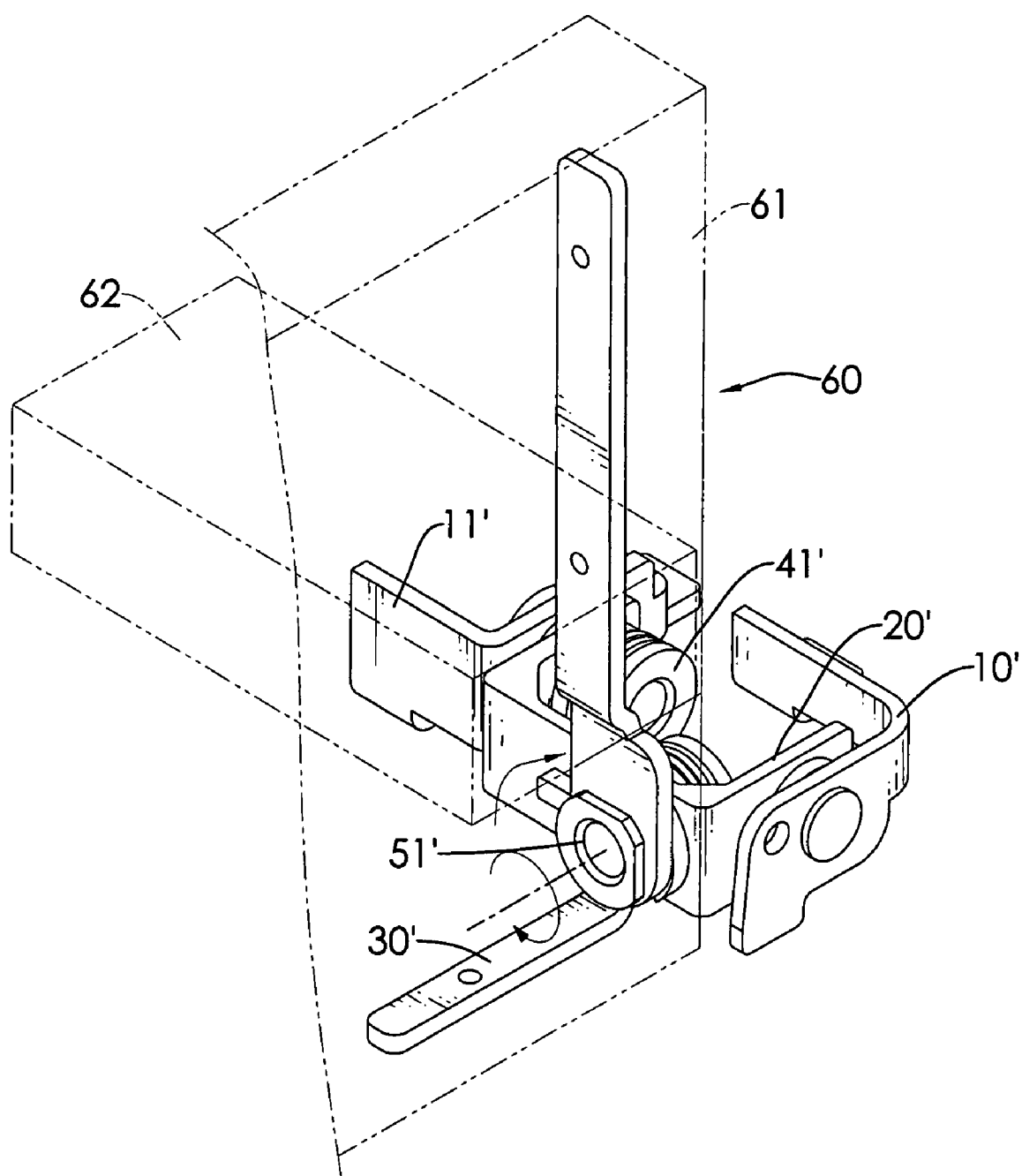
FIG. 12 is a second operational perspective view of the dual-axis hinge in FIG. 7 showing the cover pivoting relative to the base in the second axis.

With further reference to FIGS. 4 and 10, a portable electronic device (60) comprises a base (62) and a cover (61) and the dual-axis hinge in accordance with present invention is mounted between the base (62) and the cover (61). The stationary brackets (10)(11) (10')(11') is mounted securely in the base (62) with fixing holes and fasteners. The connecting leaf (30)(30') is connected securely with the cover (61) with fixing holes and fasteners.

With reference to FIGS. 5,6 and 11,12, the cover (61) connected with the connecting leaf (30)(30') may pivot relative to the base (62) in the first axis and the second axis and is held in a desired position. Therefore, the dual-axis hinge allows the portable electronic device (60) to make more motivation and contents to various applicability requirements.

Even though numerous characteristics and advantages of the present invention have been set forth in the foregoing description together with details of the structure and function of the invention, the disclosure is illustrative only. Changes may be made in detail especially in matters of shape, size and arrangement of parts within the principles of the invention to the full extent indicated by the broad general meaning of the terms in which the appended claims are expressed.

What is claimed is:

1. A dual-axis hinge for a portable electronic device comprising
   a first stationary bracket having
      a surface;
      a non-circular first mounting hole formed through the first stationary bracket; and
      a first stop protruding from the surface adjacent to the first mounting hole;
   a second stationary bracket;
   a pivoting bracket being pivotally mounted between the first stationary bracket and the second stationary bracket and having
      a first end segment being adjacent to the first stationary bracket and having
         an inside surface;
         an outside surface;
         a first pivoting hole being formed through the pivoting bracket, corresponding to the first mounting hole of the first stationary bracket and having an inner edge;
         an engaging portion being formed integrally on the inside surface of the first end segment along the inner edge of the first pivoting hole and having multiple radial concaves and convexes arranged alternatively;
         a first limit being formed integrally on the outside surface of the first end segment and having
            a central keyed hole being non-circular and corresponding to the first pivoting hole; and
            a recessed edge having a length and two ends corresponding to and selectively abutting the first stop of the first stationary bracket;
      a second end segment being adjacent to and engaging pivotally with the second stationary bracket; and
      a middle segment connecting between the first end segment and the second segment and having
         an inside surface;
         an outside surface; and
         a third pivoting hole being formed longitudinally through the middle segment;
   a connecting leaf having
      a surface;
      a connecting hole being formed through the connecting leaf, corresponding to the third pivoting hole of the middle segment and being non-circular;
   a first mounting assembly comprising
      a first pintle being non-circular in cross section and having an end extending through the first pivoting hole of the first end segment of the pivoting bracket and engaging with the first mounting hole of the first stationary bracket; and
      a positioning element being mounted on the first pintle, corresponding to the engaging portion of the first end segment and having
         a central hole being non-circular and engaging with the first pintle; and
         two salients selectively engaging with the concaves of the engaging portion to retain the position of the pivoting bracket relative to the first stationary bracket; and
   a second mounting assembly comprising a second pintle being non circular in cross section and having an end extending through the third pivoting hole of the middle segment of the pivoting bracket and engaging with the connecting hole of the connecting leaf.

2. The dual-axis hinge as claimed in claim 1, wherein the second stationary bracket has a second mounting hole formed through the second stationary bracket coaxial with the first mounting hole; and
   the second end segment of the pivoting bracket further has
      an outside surface; and
      a fastener protruding from the outside surface of the second end segment, corresponding to and pivotally engaging with the second mounting hole of the second stationary bracket and having multiple resilient protrusions being formed peripherally around the fastener and respectively having a tooth to engage with the second mounting hole.

3. The dual-axis hinge as claimed in claim 1, wherein
the middle segment further has a second limit being formed integrally on the outside surface of the middle segment of the pivoting bracket and having a protruding flange protruding radially out from the second limit and extending a radian; and
the connecting leaf further has a second stop protruding from the surface of the connecting leaf and corresponding to and selectively abutting the protruding flange of the second limit to limit a travel of the connecting leaf.

4. The dual-axis hinge as claimed in claim 1, wherein
the middle segment of the pivoting bracket further has a retaining element having a surface and a notch formed diametrically on the surface; and
the second mounting assembly further comprises a retaining member being mounted on the second pintle, corresponding to the retaining element of the middle segment of the pivoting bracket and having
a surface;
an engaging hole being non-circular and being engaged with the second pintle; and
two ribs being diametrically formed on the surface of the retaining member and selectively engaging sequentially with the notch of the retaining element to retain the position of the connecting leaf relative to the pivoting bracket.

5. The dual-axis hinge as claimed in claim 1, wherein the first stationary bracket, the second stationary racket and the connecting leaf are "L" shaped.

6. The dual-axis hinge as claimed in claim 1, wherein the pivoting bracket is "U" shaped.

* * * * *